(12) United States Patent
Kitagawa

(10) Patent No.: US 9,702,712 B2
(45) Date of Patent: Jul. 11, 2017

(54) ON-BOARD SYSTEM, INFORMATION PROCESSING APPARATUS, AND PROGRAM PRODUCT

(71) Applicant: DENSO CORPORATION, Kariya, Aichi-pref. (JP)

(72) Inventor: Nozomi Kitagawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 14/617,104

(22) Filed: Feb. 9, 2015

(65) Prior Publication Data

US 2015/0239477 A1 Aug. 27, 2015

(30) Foreign Application Priority Data

Feb. 27, 2014 (JP) .................... 2014-36898

(51) Int. Cl.
  *G01C 21/34* (2006.01)
  *G01C 21/36* (2006.01)
(52) U.S. Cl.
  CPC ......... *G01C 21/34* (2013.01); *G01C 21/3407* (2013.01); *G01C 21/362* (2013.01)
(58) Field of Classification Search
  None
  See application file for complete search history.

(56) References Cited

U.S. PATENT DOCUMENTS

| 6,285,924 B1 | 9/2001 | Okamoto et al. | |
|---|---|---|---|
| 2003/0181822 A1* | 9/2003 | Victor | A61B 3/113 600/558 |
| 2004/0199326 A1* | 10/2004 | Jung | B60K 31/0058 701/431 |
| 2004/0260440 A1* | 12/2004 | Fujita | G08B 21/06 701/36 |
| 2005/0231342 A1* | 10/2005 | Kim | B60H 1/00742 340/438 |
| 2012/0078509 A1* | 3/2012 | Choi | G01C 21/3461 701/423 |

(Continued)

FOREIGN PATENT DOCUMENTS

| JP | H11-342764 A | 12/1999 |
|---|---|---|
| JP | 2003-123198 A | 4/2003 |

(Continued)

*Primary Examiner* — Khoi Tran
*Assistant Examiner* — Ryan Rink
(74) *Attorney, Agent, or Firm* — Posz Law Group, PLC

(57) ABSTRACT

An on-board system includes at least one execution unit executing an operation for eliminating an inattentive state of a driver of a vehicle, an information acquiring section acquiring driver state information, a state determination section determining whether the driver is in the inattentive state, a position specifying section specifying a present position of the vehicle, a searching section searching for a resting place at which the driver can have a rest based on the present position and information stored in a resting place database when the driver is in the inattentive state, and an execution unit control section calculating a necessary travel time to the resting place and activates at least one target execution unit to start operation when the necessary travel time is equal to or longer than a predetermined threshold period.

13 Claims, 7 Drawing Sheets

(56) References Cited

U.S. PATENT DOCUMENTS

| | | | |
|---|---|---|---|
| 2013/0144459 A1* | 6/2013 | Ricci | G06F 9/54 |
| | | | 701/1 |
| 2013/0207805 A1* | 8/2013 | Inada | B60K 28/066 |
| | | | 340/576 |
| 2016/0052391 A1* | 2/2016 | Walsh | G08B 21/06 |
| | | | 340/575 |
| 2016/0096529 A1* | 4/2016 | Davidsson | B60Q 9/008 |
| | | | 340/576 |
| 2016/0176409 A1* | 6/2016 | Kirsch | B60W 40/08 |
| | | | 701/37 |

FOREIGN PATENT DOCUMENTS

| | | | | |
|---|---|---|---|---|
| JP | 2008-204224 | * | 9/2008 | ............... A61B 5/18 |
| JP | 2012-168591 A | | 9/2012 | |
| JP | 2014-71628 A | | 4/2014 | |

* cited by examiner

FIG. 2

| No. | NAME (ID) | SPEC INFO | PRIVATE INFO | EFFECTIVE APP | LAST APP | EXE TIME OF LAST APP | 2ND LAST APP | EXE TIME OF 2ND LAST APP |
|---|---|---|---|---|---|---|---|---|
| 1 | TARO DENSO | ..... | MALE, 44, ... | 3, 4, 5, 6 | 6 | 1310011833 | 6 | 1308011111 |
| 2 | NAMELESS | ..... | FEMALE, 41, ... | 2, 4, 5, 7 | 7 | 1310011515 | 6 | 1308011300 |
| 3 | 0566610001 | ..... | MALE, 70, ... | 5, 6 | 5 | 1303182239 | — | — |

FIG. 3

| No. | NAME | STD EXE DR (MINUTE) | EXE FLEXBT (MINUTE) | MODE | SIMULTANEOUS APP |
|---|---|---|---|---|---|
| 1 | DISPLAY BACKGROUND COLOR CHANGE | FREE | FREE | PASSIVE | 2-7 |
| 2 | VOLUME UP | FREE | FREE | PASSIVE | 1, 3-7 |
| 3 | UP-TEMPO MUSIC | FREE | FREE | PASSIVE | 1, 2, 4 |
| 4 | COLD AIR BLOW | FREE | FREE | PASSIVE | 1-3, 5-7 |
| 5 | TONGUE TWISTER | 3 | NONE | ACTIVE | 1, 2, 4 |
| 6 | FINGER MOTION | 3 | 1 | ACTIVE | 1, 2, 4 |
| 7 | FACE STRETCHING | 3 | 1 | ACTIVE | 1, 2, 4 |

FIG. 4

| TIME CHART (MINUTE) | ACTION |
|---|---|
| 0 | REST GUIDE |
| 1 | SIGHT SEEING GUIDE |
| 2 | |
| 3 | 5TH APP |
| 4 | |
| 5 | |
| 6 | |
| 7 | 4TH APP |
| 8 | |
| 9 | |
| 10 (PRIOR TO 2 MINUTES) | REST GUIDE |
| 11 | |
| 12 (PRIOR TO 20 SECONDS) | ROUTE GUIDE |

FIG. 5

| TIME CHART (MINUTE) | PRESCRIPTION A | PRESCRIPTION B |
|---|---|---|
| | ACTION | ACTION |
| 0 | REST GUIDE | 5TH APP |
| 1 | 5TH APP | |
| 2 | | |
| 3 | | |
| 4 | 4TH APP | 4TH APP |
| 5 | | |
| 6 | | |
| 7 | | |
| 8 | 3RD APP | 6TH APP |
| 9 | | |
| 10 (PRIOR TO 2 MINUTES) | | |
| 11 | REST GUIDE | REST GUIDE |
| 12 (PRIOR TO 20 SECONDS) | ROUTE GUIDE | ROUTE GUIDE |

FIG. 6A

| No. | NAME (ID) | SPEC INFO | PRIVATE INFO | EFFECTIVE APP | LAST APP | EXE TIME OF LAST APP | 2ND LAST APP | EXE TIME OF 2ND LAST APP |
|---|---|---|---|---|---|---|---|---|
| 1 | — | — | — | — | — | — | — | — |

FIG. 6B

| No. | NAME (ID) | SPEC INFO | PRIVATE INFO | EFFECTIVE APP | LAST APP | EXE TIME OF LAST APP | 2ND LAST APP | EXE TIME OF 2ND LAST APP |
|---|---|---|---|---|---|---|---|---|
| 1 | TARO DENSO | ··· | MALE, 44, ··· | 5 | 5 | 1311011833 | — | — |

FIG. 6C

| No. | NAME (ID) | SPEC INFO | PRIVATE INFO | EFFECTIVE APP | LAST APP | EXE TIME OF LAST APP | 2ND LAST APP | EXE TIME OF 2ND LAST APP |
|---|---|---|---|---|---|---|---|---|
| 1 | TARO DENSO | ··· | MALE, 44, ··· | 3, 4, 5, 6 | 6 | 1311011833 | 6 | 1308011111 |
| 2 | NAMELESS | ··· | FEMALE, 41, ··· | 2, 4, 5, 7 | 7 | 1310011515 | 6 | 1308011300 |
| 3 | 0566610001 | ··· | MALE, 70, ··· | 5, 6 | 5 | 1303182239 | — | — |

ON-BOARD SYSTEM, INFORMATION PROCESSING APPARATUS, AND PROGRAM PRODUCT

CROSS REFERENCE TO RELATED APPLICATION

This application is based on Japanese Patent Application No. 2014-036898 filed on Feb. 27, 2014, the disclosure of which is incorporated herein by reference.

TECHNICAL FIELD

The present disclosure relates to an on-board system utilized in a vehicle, an information processing apparatus, and a program product, each of which executes an operation for eliminating an inattentive state of a driver during driving of a vehicle.

BACKGROUND

Usually, in order to increase a driving safety, a driver is required to be concentrated on the driving without inattentiveness and drowsiness. Conventionally, an apparatus is proposed for eliminating a decrease in an awareness of the driver, such as an inattentive state or drowsiness. In order to eliminate a decrease in the awareness of the driver, the apparatus urges the driver to perform a predetermined motion when detecting a decrease in the awareness of the driver as disclosed in JP 2012-168591 A. Further, a different apparatus is proposed for guiding the driver to a place for taking a rest, such as a service area, when detecting an awareness decrease of the driver as disclosed in JP H11-342764 A.

For the driver who has a poor awareness state, having a rest or sleep is the best way for improving the awareness decrease. Thus, a place where the user can have a sleep is shown to the user, and the user is advised to have a sleep at the advised rest place. When the place where the user can have a sleep is far away and needs some amount of time to get to the place, it is better to improve the awareness decrease of the driver in order that the driver can drive in a safety state until the driver gets to the resting place.

In order to eliminate the awareness decrease of the driver, the apparatus may stimulate the driver in various ways or may urge the driver to perform a predetermined motion. However, in some cases, the driver may feel uncomfortable or troublesome to the predetermined motion that is required to be performed out by the apparatus.

For example, suppose that a system has a first apparatus and a second apparatus. The first apparatus guides the driver to a resting place when detecting a decrease in the awareness of the driver. The second apparatus eliminates the decrease in the awareness of the driver by urging the driver to perform some predetermined motions. Suppose that the second apparatus starts the operation for eliminating the decrease in the awareness of the driver while the first apparatus guides the driver to the resting place. In this case, when the resting place is positioned close to the present position of the vehicle, the second apparatus needs to quickly end the operation after start of the operation. Thus, the driver may feel the operation of the second apparatus which requires the driver to perform the predetermined motions is troublesome in this case.

SUMMARY

In view of the foregoing difficulties, it is an object of the present disclosure to provide an on-board system, an information processing apparatus, and a program product, each of which suppresses troublesomeness that may be felt by the driver while an operation is being carried out for eliminating an inattentive state of the driver.

According to a first aspect of the present disclosure, an on-board system includes at least one execution unit, an information acquiring section, a state determination section, a position specifying section, a searching section, and an execution unit control section. The at least one execution unit executes an operation for eliminating an inattentive state or a drowsy state of a driver of a vehicle. The information acquiring section acquires driver state information indicating a state of the driver. The state determination section determines whether the driver is in the inattentive state or in the drowsy state based on the driver state information. The position specifying section specifies a present position of the vehicle. The searching section searches for a resting place at which the driver can have a rest based on the present position of the vehicle and information stored in a resting place database when the state determination section determines that the driver is in the inattentive state or in the drowsy state. The information stored in the resting place database is related to places at which the driver can have a rest. The execution unit control section calculates a necessary travel time required for the vehicle to travel from the present position to the resting place. The execution unit control section activates at least one target execution unit to start an operation when the necessary travel time is equal to or longer than a threshold period that is preliminarily determined. The at least one target execution unit being a part of the at least one execution unit.

In the above on-board system, the target execution unit is activated when the necessary travel time to the resting place is equal to or longer than the predetermined threshold period. That is, the target execution unit is not activated when the necessary travel time to the resting place is shorter than the predetermined threshold period. Thus, the operation for eliminating the inattentive state of the driver is not executed when the driver will arrive at the resting place in a short time. Thus, the troublesomeness that may be felt by the driver can be suppressed.

According to a second aspect of the present disclosure, an information processing apparatus equipped to a vehicle includes a state determination section, a searching section, and an execution unit control section. The vehicle includes at least one execution unit executing an operation for eliminating an inattentive state or a drowsy state of a driver of the vehicle. The state determination section determines whether the driver is in the inattentive state or in the drowsy state based on driver state information acquired by an information acquiring section. The driver state information indicates a state of the driver. The searching section searches for a resting place at which the driver can have a rest based on a present position of the vehicle and information stored in a resting place database when the state determination section determines that the driver is in the inattentive state or in the drowsy state. The present position of the vehicle is specified by a position specifying section and the information stored in the resting place database is related to places at which the driver can have a rest. The execution unit control section calculates a necessary travel time required for the vehicle to travel from the present position to the resting place. The execution unit control section activates at least one target execution unit to start an operation when the necessary travel time is equal to or longer than a threshold period that is preliminarily determined. The at least one target execution unit is a part of the at least one execution unit.

With above information processing apparatus, advantages similar to the advantages provided by the first aspect of the present disclosure can be provided.

According to a third aspect of the present disclosure, a program product stored in a non-transitory tangible computer readable storage medium is disclosed. The program product is to be executed by a computer included in an information processing apparatus equipped to a vehicle. The vehicle includes at least one execution unit executing an operation for eliminating an inattentive state or a drowsy state of a driver of the vehicle. The program product includes instructions for implementing determining whether the driver is in the inattentive state or in the drowsy state based on driver state information, the driver state information indicating a state of the driver, searching for a resting place at which the driver can have a rest based on a present position of the vehicle and information stored in a resting place database when determining that the driver is in the inattentive state or in the drowsy state, the present position of the vehicle being specified by a position detecting device and the information stored in the resting place database being related to places at which the driver can have a rest, calculating a necessary travel time required for the vehicle to travel from the present position to the resting place, and activating at least one target execution unit to start an operation when the necessary travel time is equal to or longer than a threshold period that is preliminarily determined, the at least one target execution unit being a part of the at least one execution unit.

With above program product, advantages similar to the advantages provided by the first aspect of the present disclosure can be provided.

BRIEF DESCRIPTION OF THE DRAWINGS

The above and other objects, features and advantages of the present disclosure will become more apparent from the following detailed description made with reference to the accompanying drawings. In the drawings:

FIG. 2 is a table showing multiple records of information stored in a user information database;

FIG. 3 is a table showing multiple records of information stored in an inattentiveness elimination database;

FIG. 4 is a diagram showing a time chart of a combination example of awakening applications and awakening operations according to one prescription;

FIG. 5 is a diagram showing time charts of two combination examples of awakening applications and awakening operations according to two respective different prescriptions;

FIG. 6A to FIG. 6C are diagrams showing an update process of a user information database;

DETAILED DESCRIPTION

The following will describe embodiments of the present disclosure with reference to accompanying drawings.

(First Embodiment)

Figure 1:
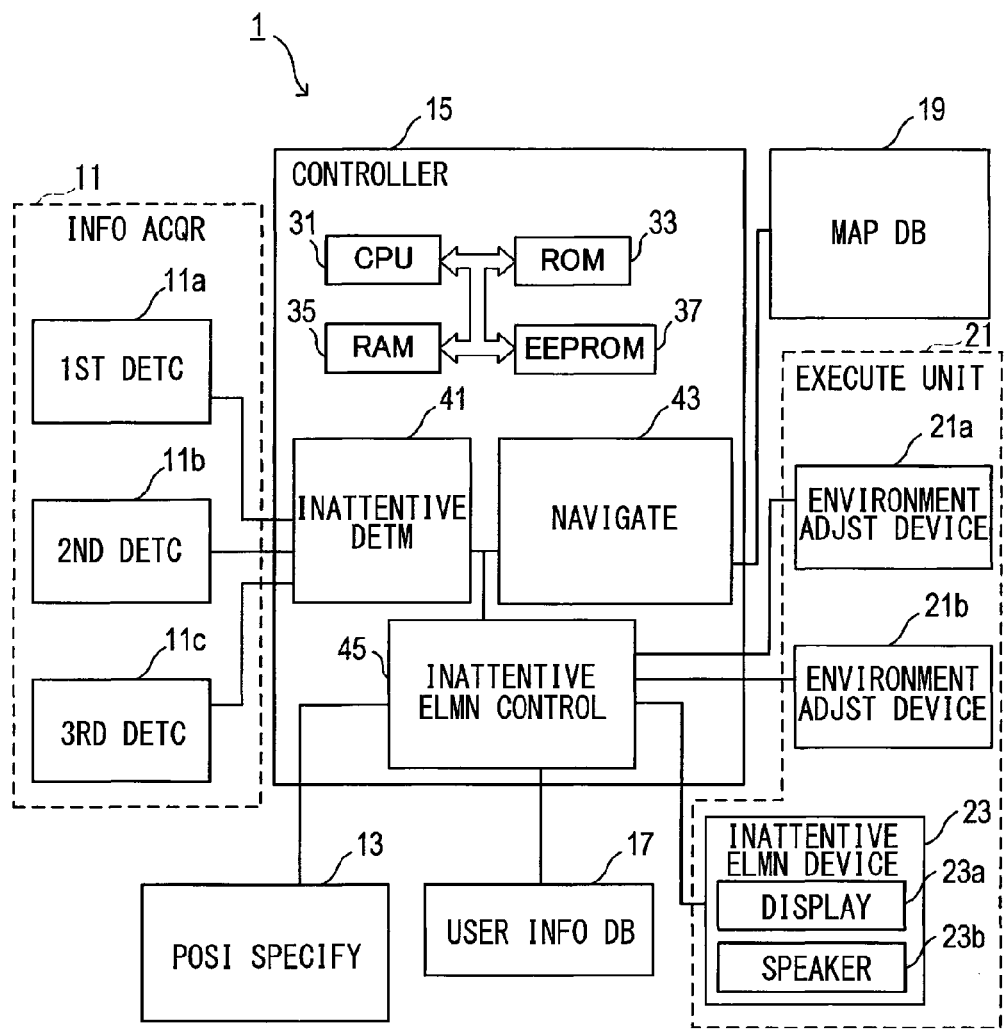
FIG. 1 is a block diagram showing a configuration of an on-board system according to an embodiment of the present disclosure.

FIG. 1 shows a configuration of an on-board system 1 according to the present embodiment. The on-board system 1 is equipped to a vehicle. As shown in FIG. 1, the on-board system 1 includes an inattentive state detection sensor group 11 including multiple inattentive state detection sensors 11a, 11b, 11c, a position specifying section (POSI SPECIFY) 13, a controller 15, a user information database (USER INFO DB) 17, a map database (MAP DB) 19, and an environment adjustment device group 21. The environment adjustment device group 21 includes multiple environment adjustment devices (ENVIRONMENT ADJST DEVICE) 21a, 21b and an inattentiveness elimination device (INATTENTIVE ELMN DEVICE) 23.

Each of the inattentive state detection sensors detects a state of the driver and acquires driver state information that indicates the state of the driver. The multiple inattentive state detection sensors 11a, 11b, 11c include a first inattentive state detection sensor (1ST DETC) 11a, a second inattentive state detection sensor (2ND DETC) 11b, and a third inattentive state detection sensor (3RD DETC) 11c. The first inattentive state detection sensor 11a is provided by an electrocardiogram sensor that detects an electrocardiogram or a heart rate of the driver. The second inattentive state detection sensor 11b is provided by an image sensor that detects an opening width of an eye of the driver, frequency of blinking, and a movement of a line of sight of the driver. The third inattentive state detection sensor 11c detects a rotation of a steering wheel of the vehicle.

As described above, the inattentive state detection sensor group 11 may include a sensor that directly detects the state of the driver, such as the first and second inattentive state detection sensors 11a, 11b. Further, the inattentive state detection sensor group 11 may include a sensor that indirectly detects the state of the driver, such as the third inattentive state detection sensor 11c. Further, the inattentive state detection sensor group 11 may include a voice sensor that detects a voice made by the driver, a sphygmocardiogram sensor, or a sensor that detects an operation made to an acceleration pedal, a brake pedal or the like in addition to or instead of the above-described sensors 11a to 11c. The inattentive state detection sensor group 11 functions as an example of information acquiring section (INFO ACQR) in the present disclosure.

The position specifying section 13 detects and specifies a present position of the vehicle. The position specifying section 13 receives, from a global positioning satellite (GPS), GPS related information via a GPS antenna. The position specifying section 13 includes a GPS receiver that detects a global position coordinate of the vehicle, a gyroscope that outputs a detection signal corresponding to an angular velocity of a rotation applied to the vehicle, and a vehicle speed sensor that outputs a detection signal corresponding to a speed of the vehicle. The GPS receiver, the gyroscope, and the speed sensor have different types of errors, and detect and specify the present position of the vehicle in a complementary manner.

The position specifying section 13 outputs, to the controller 15, vehicle position information that indicates the present position of the vehicle and vehicle speed information that indicates the speed of the vehicle. The controller 15 is provided by a well-known microcomputer, which includes a central processing unit (CPU) 31, a read-only memory (ROM) 33, a random access memory (RAM) 35, an electrically erasable programmable read-only memory (EEPROM) 37, an input/output (I/O) (not shown), and a bus line that connects all of these components. The controller 15 controls operations of the on-board system 1. The controller 15 includes an inattentive state determination section (INATTENTIVE DETM) 41, a navigation section (NAVIGATE) 43, an inattentiveness elimination control section (INATTENTIVE ELMN CONTROL) 45 as functional blocks.

The inattentive state determination section 41 determines whether the driver is in an inattentive state or in a drowsy state based on the output of the inattentive state detection sensor group 11. In the present embodiment, a state in which the awareness of the driver is decreased is measured by an inattentiveness degree as a parameter. The inattentiveness degree is comprehensively calculated based on (i) a drowsiness level that is acquired from the electrocardiogram output from the electrocardiogram sensor 11$a$, (ii) a drowsiness level or an inattentiveness level that is acquired from the opening degree of the eye, the blinking frequency, or the movement of the line of the sight output from the image sensor 11$b$, (iii) or an inattentiveness level that is acquired by the third inattentive state detection sensor 11$c$ based on a manipulation made by the driver to the steering wheel of the vehicle.

In the present embodiment, the inattentiveness degree has five levels from level 1 to level 5. The level 1 of the inattentiveness degree is a normal state other than the inattentive state or the drowsy state. The inattentive state gets worse with an increase of the level from level 2 to level 5. The highest level of the inattentive state corresponds to the drowsy state. Thus, in the present embodiment, the inattentive state having level 5 corresponds to the drowsy state. In the present disclosure, the inattentive state includes the drowsy state. The inattentive state determination section 41 functions as an example of state determination section in the present disclosure.

The navigation section 43 performs a route guidance based on the present position specified by the position specifying section 13 and the map database 19. In the route guidance, the navigation section 43 calculates a route from the present position of the vehicle to a destination set by a user based on the map database 19, displays the calculated route on a display device with consideration of a relation between the present position and the route to the destination, and outputs guidance related to the driving operation to the driven In an automatic calculation of the best route, cost calculation method, such as well-known Dijkstra's algorithm may be used.

The map database 19 stores road data, intersection position data, railroad crossing position data, classification and positions of facilities, and other data that need to be displayed on the map display. The map database 19 further stores resting place information. The navigation section 43 performs the route guidance with reference to the map data stored in the map database 19. The map database 19 functions as an example of resting place database in the present disclosure.

When the driver is determined to be in the inattentive state, that is, when the inattentiveness degree of the driver is equal to level 2 or higher, the navigation section 43 (i) searches for a resting place, (ii) calculates a travel time required for the vehicle to travel from the present position to the set resting place, and (iii) performs route guidance to the resting place. The navigation section 43 functions as an example of searching section, and also functions as an example of notification section in the present disclosure.

The inattentiveness elimination control section 45 identifies the driver based on the output information from the image sensor or based on an input operation made by the user. Then, the inattentiveness elimination control section 45 generates a prescription and performs an inattentiveness elimination process according to a program stored in the ROM 33 to control an operation of the environment adjustment device group 21. Details of the inattentiveness elimination process will be described later. The inattentiveness elimination control section 45 functions as an example of driver identification section, and also functions as example of execution unit control section in the present disclosure.

As shown in FIG. 2, the user information database 17 stores multiple records of information related to multiple users (drivers). Each record may include a name or an identification (ID) of the user, specification information (SPEC INFO) that is used for specifying the user, private information (PRIVATE INFO), such as gender or age of the user, effective awakening application programs (EFFECTIVE APP), the last awakening application program (LAST APP) executed at immediately last time and an execution time (EXE TIME) thereof, and an awakening application program (2ND LAST APP) executed just before the last awakening application program and an execution time (EXE TIME OF 2ND LAST APP) thereof. Hereinafter, the awakening application program is also referred to as awakening application (APP). The awakening application is an operation or a process for improving an inattentive state of the driver. In the present embodiment, the environment adjustment devices 21$a$, 21$b$ and the inattentiveness elimination device 23 execute respective awakening applications.

The environment adjustment devices 21$a$, 21$b$ include a first environment adjustment device 21$a$ and a second environment adjustment device 21$b$. Each environment adjustment device 21$a$, 21$b$ adjusts a driving environment around the driver. In the present embodiment, the first environment adjustment device 21$a$ is provided by an audio device, and the second environment adjustment device 21$b$ is provided by an air conditioning device.

The inattentiveness elimination device 23 outputs an instruction to the driver to perform a predetermined motion. The inattentiveness elimination device 23 includes a display device (DISPLAY) 23$a$ and a speaker 23$b$. The inattentiveness elimination device 23 is able to perform various awakening applications. For example, the various awakening applications may include an awakening application that instructs the driver to perform a tongue twister. For example, the various awakening applications may include an awakening application that instructs the driver to perform a finger movement. For example, the various awakening applications may include an awakening application that instructs the driver to perform a face stretching. Specifically, the display device 23$a$ displays the images or instructions related to the above-described predetermined motion, and the speaker 23$b$ auxiliary outputs an audio guidance in order to instruct the driver to perform the predetermined motion.

The display device 23$a$ and the speaker 23$b$ may also be used when the navigation section 43 performs the route guidance. The environment adjustment devices 21$a$, 21$b$ and the inattentiveness elimination device 23 correspond to an example of execution unit (EXECUTE UNIT) in the present disclosure. Since the operations of the environment adjustment devices 21$a$, 21$b$ and the inattentiveness elimination device 23 are controlled by the inattentiveness elimination control section 45 in order to eliminate the inattentive state of the driver, the inattentiveness elimination control section 45 functions as an example of execution unit control section in the present disclosure.

The following will describe a process executed by the controller 15 of the on-board system 1. The inattentiveness elimination control section 45 included in the controller 15 generates the prescription when the inattentive state of the driver is detected. In the present disclosure, the prescription is a combination of multiple awakening applications and awakening operations arranged in a predetermined execution order. The prescription is generated with consideration of the driver information stored in the user information database 17.

The EEPROM 37 stores an inattentiveness elimination database. As shown in FIG. 3, the inattentiveness elimination database stores multiple records of awakening applications. Each awakening application includes a reference number, an application name, a standard execution duration (STD EXE DR), an execution duration flexibility (EXE FLEXBT), an operation mode (MODE) being one of an active operation and a passive operation, reference numbers of one or more different simultaneous applications (SIMULTANEOUS APP) that can be simultaneously executed with the subject application. Hereinafter, for description convenience, the awakening application having the reference number 1 is referred to as a first application, the awakening application having the reference number 2 is referred to as a second application, the awakening application having the reference number 3 is referred to as a third application, the awakening application having the reference number 4 is referred to as a fourth application, the awakening application having the reference number 5 is referred to as a fifth application, the awakening application having the reference number 6 is referred to as a sixth application, and the awakening application having the reference number 7 is referred to as a seventh application.

The awakening applications include active awakening applications and passive awakening applications. The awakening application having the active operation as the operation mode corresponds to the active awakening application, and the awakening application having the passive operation as the operation mode corresponds to the passive awakening application.

The following will describe the passive awakening applications in detail with reference to FIG. 3. The first application having the name of "display background color change" changes a background color of the display device 23*a* of the inattentiveness elimination device 23. The second application having the name of "volume up" increases a volume of a guidance or a music play. The third application having the name of "up-tempo music" plays an up-tempo music in a compartment of the vehicle. The second application and the third application are performed by the environment adjustment device 21*a*, which is provided by the audio device. The fourth application having the name of "cold air blow" controls the environment adjustment device 21*b* to blow cold air toward a driver seat. Herein, the environment adjustment device 21*b* is the air conditioning device.

As described above, the passive awakening applications stimulate various senses of the driver including sight, hearing, and tactile in order to eliminate the inattentive state of the driver.

The following will describe the active awakening applications in detail with reference to FIG. 3. The active awakening applications include the fifth application having the name of "tongue twister", the sixth application having the name of "finger motion", and the seventh application having the name of "face stretching". These active awakening applications are performed by the inattentiveness elimination device 23. These active awakening applications instruct the driver to perform predetermined motions in order to eliminate the inattentive state of the driver.

The standard execution duration is a period necessary for executing the corresponding awakening application. The passive awakening application is able to be executed continuously. Thus, the standard execution duration is not set for the passive awakening application. That is, the standard execution duration of the passive awakening application is free. On the other hand, the active awakening applications have respective predetermined standard execution durations. The execution duration flexibility is a changeable range of the standard execution duration of the active awakening application. The standard execution duration is also referred to as execution duration.

Among the awakening applications, two applications selected from the third passive application having the name of "up-tempo music" and the fifth to seventh active applications cannot be executed simultaneously. However, among the awakening applications, two or more awakening applications that do not conflict with one another can be simultaneously performed.

The following will describe a generation of the prescription by the inattentiveness elimination control section 45 and an update algorithm of the user information database 17.

First, the inattentiveness elimination control section 45 specifies the driver using the specification information stored in the user information database 17. For example, the specification information may be provided by the ID of the user. When the user inputs the ID of himself or herself, the inattentiveness elimination control section 45 identifies the user with reference to the information stored in the user information database 17. The specification information may be provided by a face image of the user. In this case, the image sensor may take an image of the face of the driver, and inputs the face image to the user information database 17 as the specification information.

The following execution is carried out when the user is determined to be in the inattentive state during the driving. The inattentiveness elimination control section 45 acquires the effective awakening applications that effectively eliminate the inattentive state of the identified driver and the last awakening application executed at immediately last time.

Then, the inattentiveness elimination control section 45 randomly selects, from the effective awakening applications, one awakening application different from the last awakening application. Then, the inattentiveness elimination control section 45 acquires the standard execution duration Ta1 of the selected awakening application from the inattentiveness elimination database.

Then, the inattentiveness elimination control section 45 calculates a remaining period Td by subtracting the standard execution duration Ta1 of the selected awakening application from the necessary travel time Tsa necessary for the vehicle to travel from the present position to the resting place. That is, the remaining period Td can be calculated by the expression Td=Tsa−Ta1. Herein, multiple resting places where the driver can have a rest may be positioned along a route that is estimated based on the destination or the travelling direction of the vehicle. Among the multiple resting places, the resting place closest to the present position of the vehicle is selected as the most proper resting place. The resting place, which is also known as a travel plaza, rest stop, a service area or a drive-in spot, is a facility located along or close to a road, highway, expressway, or freeway. The driver or the passenger can have a rest at the resting place. The necessary travel time Tsa can be calculated based on a distance from the present position of the vehicle to the resting place and congestion information of the traffic.

Then, the inattentiveness elimination control section 45 determines whether the remaining period Td is equal to or longer than a predetermined reference period Trf. When the remaining period Td is equal to or longer than the reference period Trf, the inattentiveness elimination control section 45 (i) randomly selects, from the effective awakening applications, an awakening application different from the awakening application has been selected at last time, (ii) acquires the standard execution duration Ta1 of the newly selected awakening application from the inattentiveness elimination database, and (iii) calculates a new remaining period Td by subtracting the standard execution duration Ta1 of the newly selected awakening application from the remaining period Td calculated at last time using the expression Td=Td−Ta1. The inattentiveness elimination control section 45 repeatedly executes the above-described process (i), (ii), and (iii) in order until the latest remaining period Td becomes shorter than the reference period Trf.

Then, the inattentiveness elimination control section 45 generates the prescription by ordering one or more selected awakening applications. Then, the inattentiveness elimination control section 45 carries out an inattentive driving elimination process according to the prescription, and updates the last awakening application and the awakening application executed just before the last awakening application stored in the user information database 17. The generation of the prescription and the update of the user information database 17 are carried out by the inattentiveness elimination control section 45 in above-described manner.

FIG. 4 shows a time chart of an example of the prescription. In the time chart shown in FIG. 4, a unit of time is minute. In this example, the driver of "Taro Denso" shown in the user information database 17 of FIG. 2 is identified as the driver of the subject vehicle, and the necessary travel time to the service area, which is selected as the most proper resting place, is 12 minutes.

At a time point of "0" right after the determination of the inattentive state, the on-board system 1 performs rest guidance for instructing the driver to have a rest at a service area (SA). Specifically, the suggestion for taking a rest at the service area and route guidance to the service area are shown to the driver by images displayed on the display device 23a and audio speech guidance output by the speaker 23b. For example, a message, such as "please have a rest at service area", can be output to the user as an image notification or an audio guidance. Then, introduction of the service area and surrounding sightseeing spots of the service area are shown to the driver at a time point of "1".

Then, when 3 minutes of time elapses, the on-board system 1 executes the fifth application of "tongue twister", which is one of the effective awakening applications of the driver Taro Denso at a time point of "3". Since the standard execution duration of the fifth application is 3 minutes, the fifth application of "tongue twister" is executed for 3 minutes from the time point "3" to the time point "5" of the time chart.

After the fifth awakening application is ended, the fourth awakening application is carried out from the time point "7" to the time point "9" of the time chart. The on-board system 1 carries out the rest guidance again at the time point "10", which is two minutes prior to an arrival at the service area. For example, a message, such as "please have a rest at service area, two minutes left", can be output to the user by an image notification or an audio guidance. The on-board system 1 carries out the route guidance once again 20 seconds prior to the arrival at the service area. For example, a message, such as "entrance road to the service area soon", can be output to the user by an image notification or an audio guidance.

Since the rest guidance includes the route guidance to the service area, the rest guidance is carried out in a non-overlapped manner with the awakening application. The generation of the prescription may be changed with consideration of the level of the inattentiveness degree. For example, when the level of the inattentiveness degree is higher than the level of the inattentiveness degree in the above-described example shown in FIG. 4, the prescription A shown in FIG. 5 may be generated. Specifically, in the prescription A, the awakening applications may be executed at an early time point without executing the introduction of the resting place and surrounding sightseeing spots. For another example, when the level of the inattentiveness degree is higher than the level of the inattentiveness degree corresponding to the prescription A shown in FIG. 5, the prescription B shown in FIG. 5 may be generated. Specifically, in the prescription B, the awakening applications may be executed without executing the rest guidance at the first.

In the present disclosure, the effective awakening application is set as an application that effectively eliminates the inattentive state of the driver. For example, when the inattentiveness degree of the driver improves by a predetermined level (for example, one level) and maintains the improved state for three minutes after the execution of the application, the application may be set as the effective awakening application. Herein, the improving of the inattentiveness degree corresponds to a decrease in level of the inattentiveness degree. In the above-described example for generating the prescription, the awakening applications other than the effective awakening applications are not included in the prescription. Alternatively, when the inattentiveness degree has a slightly low level, that is, when the awareness of the driver is relatively high, the awakening applications other than the effective awakening applications may also be used for generating the prescription.

For example, when the user is in an inattentive state which has a low level of inattentiveness degree, the awakening applications other than the effective awakening applications can be selected randomly for generating the prescription. Then, a change of the inattentiveness degree of the driver can be monitored for three minute time after executing the selected awakening application.

At an initial state, the user information database 17 stores no information. Thus, as shown in FIG. 6A, before storing the driver information, the user information database 17 stores items related to the driver information, such as driver name, specification information, private information or the like. At this time, since the user information database 17 has no history records of the drivers, the awakening application is selected randomly. When one record of driver information "TARO DENSO" is newly stored and one awakening applications, for example, fifth application is determined to be effective to the specified user, the user information database 17 stores this awakening application as the effective awakening application as shown in FIG. 6B. For multiple drivers, the user information database 17 stores information shown in FIG. 6C by executing the awakening application to the corresponding user by multiple times.

Figure 7:
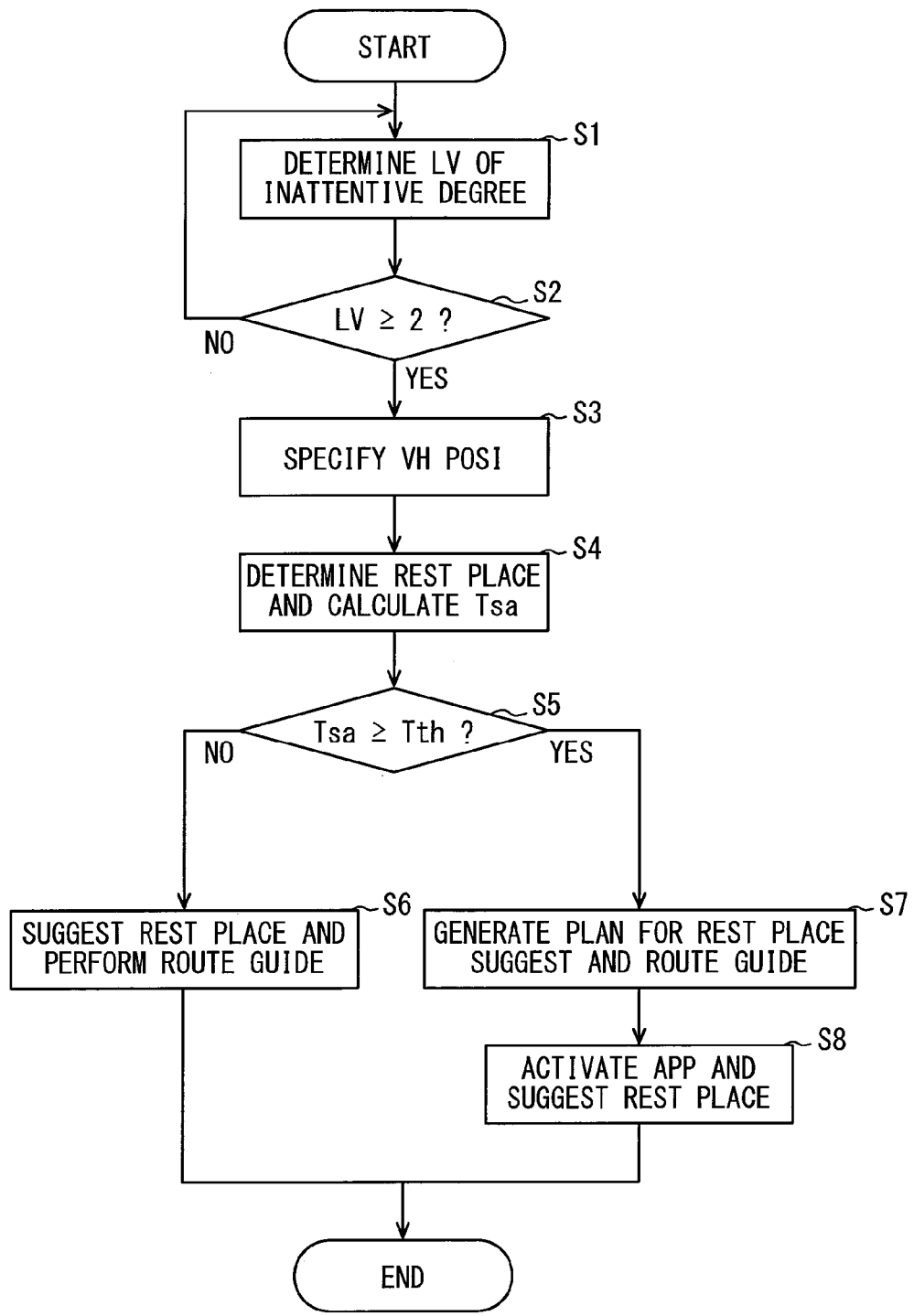
FIG. 7 is a flowchart showing an inattentive state elimination process according to one embodiment of the present disclosure.

The following will describe the inattentiveness elimination process executed by the CPU 31 of the controller 15 with reference to the flowchart shown in FIG. 7. The CPU 31 starts the inattentiveness elimination process after the on-board system 1 is activated and the identification of the user is carried out.

At S1, the CPU 31 determines the inattentiveness degree of the driver. Specifically, the CPU 31 specifies the level (LV) of the inattentiveness degree of the driver from level 1 to level 5. At S2, the CPU 31 determines whether the level of the inattentiveness degree is equal to or higher than two. When the CPU 31 determines that the level of the inattentiveness degree is lower than two (S2: NO), the CPU 31 returns to S1 and determines the inattentiveness degree again. The CPU 31 repeatedly determines the inattentiveness degree until the inattentive state is detected, that is, the level of the inattentiveness degree is equal to or higher than two.

At S2, when the CPU 31 determines that the level of the inattentiveness degree is equal to or higher than two (S2: YES), the CPU 31 specifies the present position of the vehicle at S3, and determines the resting place positioned close to the travelling route and calculates the necessary travel time Tsa necessary for the vehicle to travel from the present position to the resting place at S4.

At S5, the CPU 31 determines whether the necessary travel time Tsa is equal to or longer than a predetermined threshold period Tth. In the present embodiment, the threshold period Tth is set to 5 minutes. When the CPU 31 determines that the necessary travel time Tsa is shorter than the predetermined threshold period Tth (S5: NO), the CPU 31 suggests a resting place and performs route guidance to the resting place at S6. Specifically, the display device 23a displays some contents to notify the user to have a rest, and then, the route guidance to the resting place is carried out. After the route guidance, the CPU 31 ends the inattentiveness elimination process.

At S5, when the CPU 31 determines that the necessary travel time Tsa is equal to or longer than the predetermined threshold period Tth (S5: YES), the CPU 31 selects the awakening applications and generates a plan for resting place suggestion and resting place guidance at S7. Specifically, the CPU 31 generates the above-described prescription, and determines time points to perform the resting place suggestion and the route guidance to the resting place. Then, the CPU 31 activates each awakening application according to the plan, performs the rest suggestion at the resting place, and performs the route guidance to the resting place at S8. After S8, the CPU 31 ends the inattentiveness elimination process.

In the above on-board system 1, each of the inattentive state detection sensors 11a to 11c acquires information related to the driver state, and the inattentive state determination section 41 determines the inattentiveness degree of the driver based on the acquired information. When the level of the inattentiveness degree is equal to or higher than 2, that is, when the driver is determined to be in the inattentive state, the navigation section 43 searches for and determines a resting place based on the present position of the vehicle and the information stored in the map database 19, and performs the route guidance to the selected resting place. Herein, the present position of the vehicle is specified by the position specifying section 13.

When the necessary travel time to the resting place is equal to or longer than the predetermined threshold period, for example, 5 minutes, the inattentiveness elimination control section 45 executes the awakening application for eliminating the inattentive state or the drowsy state of the driver of the vehicle.

The on-board system 1 includes one or more execution units which execute respective operations for eliminating the inattentive state or the drowsy state of the driver of the vehicle. Herein, the operation for eliminating the inattentive state or the drowsy state of the driver of the vehicle corresponds to the awakening application. The one or more execution units include the environment adjustment devices 21a, 21b, the inattentiveness elimination device 23 or the like.

The on-board system 1 includes the information acquiring section that acquires driver state information indicating the state of the driver. In the present embodiment, the inattentive state detection sensors 11a to 11c correspond to the information acquiring section.

The on-board system 1 includes the state determination section that determines whether the driver is in the inattentive state or in the drowsy state based on the information acquired by the information acquiring section. In the present embodiment, the inattentive state determination section 41 corresponds to the state determination section.

The on-board system 1 includes the position specifying section 13 that specifies the present position of the vehicle.

The on-board system 1 includes the searching section. In the present embodiment, the navigation section 43 corresponds to the searching section. When the state determination section determines that the driver is in the inattentive state or in the drowsy state, the searching section searches for the resting place where the driver can have a rest based on the present position of the vehicle and the information stored in the resting place database. The resting place database is provided by the map database 19, and stores information related to the places where the driver can have a rest.

The on-board system 1 includes the execution unit control section that calculates the necessary travel time from the present position to the resting place determined by the searching section, and activates the one or more execution units when the necessary travel time to the selected resting place is equal to or longer than the threshold period. In the present embodiment, the inattentiveness elimination control section 45 corresponds to the operation control section.

In the above-described on-board system 1, the awakening application is not executed when the necessary travel time to the resting place is shorter than the predetermined threshold period. Thus, the operation for eliminating the inattentive state of the driver is not executed when the driver will arrive at the resting place in a short time. Thus, the troublesomeness that may be felt by the driver can be suppressed. The on-board system 1 performs both the awakening application and route guidance to the resting place. Thus, the driver is provided with the information of the resting place in a better way, and the driver is more easily induced to have a rest at the resting place.

In the on-board system 1 according to the present embodiment, the navigation section 43 performs the route guidance to the resting place and the awakening application is carried out during an interval between the multiple times of route guidance. The on-board system 1 includes the notification section that notifies the route from the present position to the resting place determined by the searching section. The navigation section 43 corresponds to the notification section in the present embodiment. The execution unit control section activates the execution unit to execute the applications during a non-notification period. Herein, the non-notification period is a period during which the notification of the route guidance is not carried out.

In the above-described on-board system 1, by executing the awakening application, the driver is less likely to overlook the route guidance and a possibility of failing to arrive at the resting place can be reduced.

The route guidance to the resting place and the awakening application may be simultaneously executed. In this case, the route guidance should be executed with a higher priority than the awakening application. In the on-board system 1 according to the present embodiment, multiple awakening applications have respective standard execution duration. The awakening applications are selected for generating the prescription so that a total sum of the standard execution durations of the awakening applications is equal to or shorter than a predetermined time period.

Suppose that the on-board system 1 has two or more execution units and the two execution units have respective standard execution durations. When the necessary travel time to the resting place is equal to or longer than the predetermined threshold period, the execution unit control section selects one or more target execution units so that a total sum of the execution durations of the one or more execution units is equal to or shorter than the necessary travel time. Then, the controller executes the selected target execution units in a predetermined order.

With above-described on-board system 1, an interruption of the awakening applications caused by the arrival at the resting place can be suppressed even when multiple awakening applications are executed. Thus, the troublesomeness that may be felt by the driver can be suppressed with certainty.

When the necessary travel time to the resting place is equal to or longer than a certain period, even though the awakening application is interrupted caused by the arrival at the resting place, the inattentive state of the driver can be eliminated to a certain degree. Thus, the awakening applications may also be selected so that the total sum of the execution durations is equal to or longer than the necessary travel time.

In the on-board system 1 according to the present embodiment, the driver is identified by the input manipulation made by the driver or the face image acquired by the image sensor. The user information database 17 stores multiple different types of effective awakening applications for each driver, and selects the effective awakening applications with a higher priority when generating the prescription.

The on-board system 1 includes the driver identification section. In the present embodiment, the inattentiveness elimination control section 45 corresponds to the driver identification section. The on-board system 1 further includes the user information database 17 that stores multiple records for multiple drivers. Each record includes information indicating an effect of each execution unit to the corresponding driver. The execution unit control section selects the execution unit that has an improved effect to the driver identified by the driver identification section with a higher priority, and activates the execution unit to perform the operation.

In the above-described on-board system 1, the awakening application can be executed with consideration of the effect of the awakening application to each driver. Thus, the elimination of the inattentive state of each driver can be improved with a higher performance.

In the present embodiment, the awakening applications are classified according to the effect of the awakening application to the corresponding driver. The effect of the awakening application may be evaluated with three levels to classify and store the effective awakening applications. In order to reduce a processing load, a determination or an evaluation of the effect of the awakening application may also be omitted.

In the above-described on-board system 1, the awakening applications may be executed with a higher priority than the route guidance when the level of the inattentiveness degree is higher than a predetermined level, such as level 3. Specifically, in the on-board system 1, the state determination section determines, based on the driver state information acquired by the information acquiring section, the level of the inattentive state or the drowsy state. The execution unit control section may activate the execution unit with a higher priority than an activation of the notification section when the level of the inattentiveness degree is higher than the predetermined level.

In the above-described on-board system 1, the awakening application is quickly activated when the inattentiveness degree of the inattentive state has a high level, such as the drowsy state having the highest level of the inattentiveness degree. Thus, the inattentive state of the driver can be quickly eliminated.

The controller 15 according to the present embodiment may activate one or more execution units in order to eliminate the inattentive state or the drowsy state of the driver. In this case, the one or more execution units include the environment adjustment devices 21*a*, 21*b* and the inattentiveness elimination device 23.

The controller 15 includes the state determination section that determines whether the driver is in the inattentive state or in the drowsy state based on the driver state information, which indicates the state of the driver and is acquired by the information acquiring section. In the present embodiment, the inattentive state detection sensors 11*a* to 11*c* correspond to the information acquiring section, and the inattentive state determination section 41 corresponds to the state determination section.

The controller 15 includes the searching section. In the present embodiment, the navigation section 43 corresponds to the searching section. When the state determination section determines that the driver is the inattentive state or in the drowsy state, the searching section searches for and determines the resting place where the driver can have a rest based on the present position of the vehicle and the resting place database. In the present embodiment, the map database 19 corresponds to the resting place data base, and the resting place data base includes information related to places where the driver can get a rest. The present position of the vehicle is acquired by the position specifying section.

The controller 15 includes the execution unit control section that calculates the necessary travel time from the present position to the resting place determined by the searching section, and activates the one or more execution units when the necessary travel time to the selected resting place is equal to or longer than the threshold period. In the present embodiment, the inattentiveness elimination control section 45 corresponds to the operation control section.

With the above-described controller 15, the awakening application is not executed when the necessary travel time to the resting place is shorter than the predetermined threshold period. Thus, the operation for eliminating the inattentive state of the driver is not executed when the driver will arrive at the resting place in a short time. Thus, the troublesomeness that may be felt by the driver can be suppressed.

(Other Embodiments)

Figure 8:
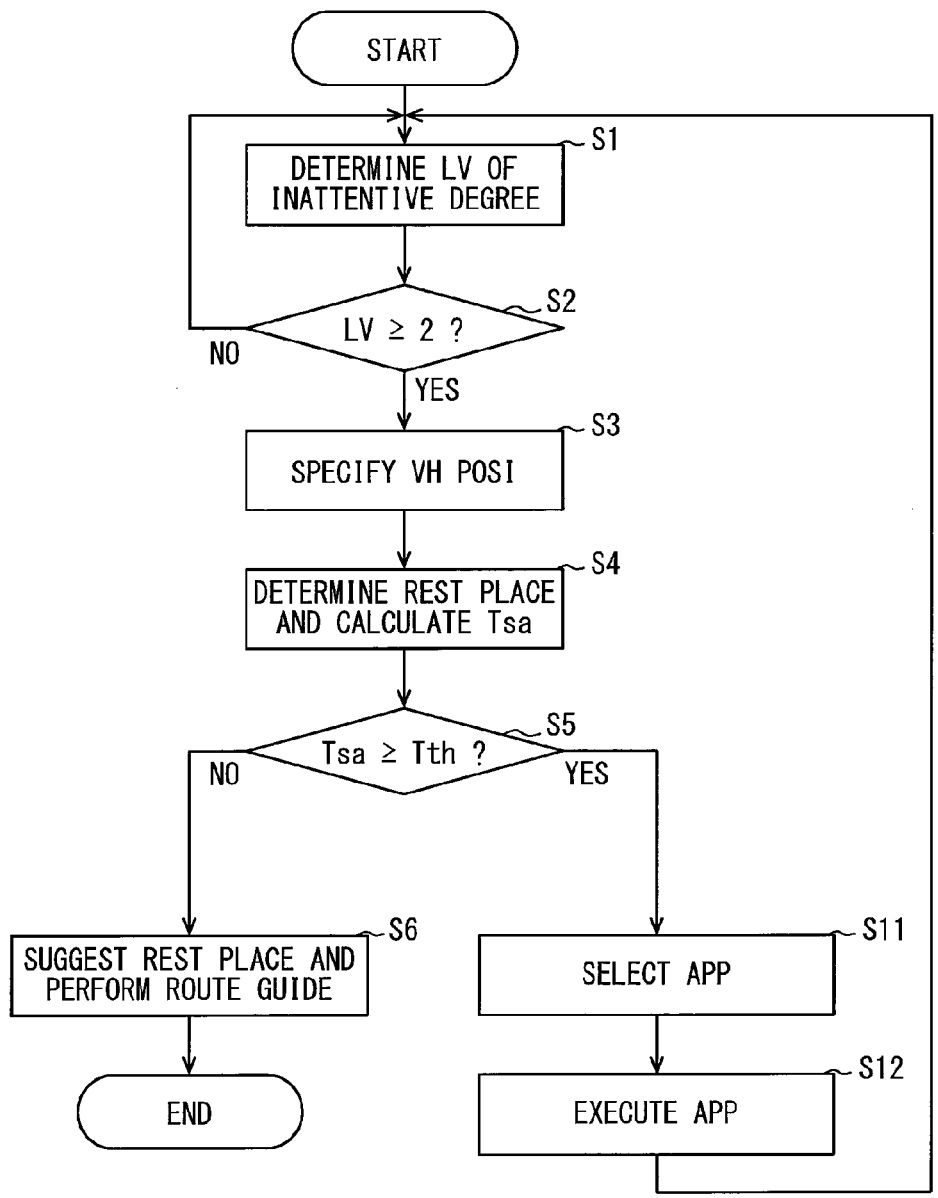
FIG. 8 is a flowchart showing an inattentive state elimination process according to another embodiment of the present disclosure.

In the foregoing embodiment, the effective awakening applications are selected to generate the prescription, and the operations are carried out according to the prescription. As another example, the awakening applications included in the prescription may be selected one by one in real time. The specific process of this example will be described with reference to the flowchart shown in FIG. 8. In the flowchart shown in FIG. 8, the same or equivalent step with the flowchart shown in FIG. 7 has the same reference symbol with the step shown in FIG. 7.

Since the processes executed at S1 to S4 are similar to the above-described embodiment, detailed description will be omitted.

At S5, when the necessary travel time is equal to or longer than the threshold period, for example, 5 minutes (S5: YES), the CPU 31 selects one awakening application at S11. Then, the CPU 31 activates the corresponding execution unit and executes the selected awakening application at S12. Then, the CPU 31 returns to S1 after the execution of the selected application is ended and repeatedly executes the process from S1.

With above-described on-board system, the troublesomeness that may be felt by the driver can be suppressed similar to the above-described embodiment.

In the foregoing embodiments, the execution of the awakening application is determined whether the necessary travel time is equal to or longer than the threshold period. The threshold period is set to 5 minutes in the foregoing embodiments. As another example, the threshold period may be a variable value. For example, the inattentiveness elimination control section 45 may increase the threshold period with an increase of a necessary guidance period which is necessary for the navigation section 43 to guide the resting place to the driver.

Specifically, suppose that the necessary guidance period which is necessary for the navigation section 43 to guide the resting place to the driver is equal to 3 minutes. In this case, the threshold period may be set as 8 minutes obtained by adding the 3 minutes of the necessary guidance period to an initial value, which is 5 minutes, of the threshold period. The threshold period may also be set using another method different from above-described simple adding. For example, a half of the necessary guidance period may be added to the initial value of the threshold period to get the variable threshold period.

With above-described on-board system 1, the execution of the awakening application can be determined with an exclusion of the necessary guidance period. Thus, the troublesomeness that may be felt by the driver can be suppressed with certainty.

The threshold period in the foregoing embodiments may be changed corresponding to the awakening application. For example, when executing the awakening application having relatively short standard execution duration, the threshold period can be decreased corresponding to the standard execution duration of the awakening application.

The awakening applications may be changed corresponding to the necessary travel time to the resting place. Specifically, a threshold execution duration may be set for each awakening application, and the awakening application that has the threshold execution duration lower than the necessary travel time can be selected to be carried out.

The awakening applications may further include applications different from above-described applications. For example, the awakening applications may include an operation executed by an apparatus that vibrates the driver seat, a game application that requires the driver to tap the steering wheel for playing the game, or the like.

In the foregoing embodiments, the awakening applications include the active awakening applications and the passive awakening applications. The awakening applications to be executed depend on the determination result of the necessary travel time may only include the active awakening applications.

Specifically, in the on-board system 1, the execution unit requires the driver to perform the predetermined motion. Thus, the troublesomeness that may be felt by the user may be greater in the active awakening application than in the passive awakening application. With above-described on-board system 1, the execution of the active awakening application is avoided when the necessary travel time to the resting place is relatively short. Thus, the troublesomeness that may be felt by the user can be further suppressed.

The passive awakening application which the driver may feel less troublesome when interrupted can be executed in response to a detection of the inattentive state of the driver regardless of the necessary travel time to the resting place.

The above-described sections included in the controller 15 can be achieved by a program stored in a non-transitory tangible computer readable storage medium as a program product.

The above-described program includes instructions to be executed by a computer, and the instructions are ordered in an appropriate manner for being executed by the computer. This program may be stored in a ROM or in a RAM that is embedded in the computer. This program may be downloaded to the computer for execution. The program may be downloaded from various external storage medium to the computer. The program may also be downloaded from a network to the computer using a communication line.

The various storage medium may include optical discs, such as Compact Disc Read Only Memory (CD-ROM) or Digital Versatile Disk Read Only Memory (DVD-ROM), magnetic discs, or semiconductor memories.

The controller 15 may be provided by a programmable logic device, such as Application Specific Integrated Circuits (ASIC) or Field Programmable Gate Array (FPGA). The controller 15 may also be provided by a discrete circuit or the like.

The controller 15 functions as the information processing apparatus according to the present disclosure. For example, an integrated circuit other than the CPU 31 may function as the inattentive state determination section 41 and may determine the level of the inattentiveness degree.

As another example, the navigation section can be configured as a separate navigation device from the controller 15. In this case, the separate navigation device may operate inter-connectedly with the controller 15, and may be configured to execute similar process with the navigation section 43 described above.

In the foregoing embodiments, when the inattentive state of the driver is detected, the suggestion of the resting place and the rouge guidance to the resting place are carried out. As another example, when the level of the inattentiveness degree is relatively low, the suggestion of the resting place may be omitted.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An on-board system comprising:
a controller, the controller is configured to
execute, by at least one execution unit, an operation adapted to eliminate an inattentive state or a drowsy state of a driver who drives a vehicle;
acquire, from an information acquiring section, driver state information indicating a state of the driver;
determine, in a state determination section, whether the driver is in the inattentive state or in the drowsy state based on the driver state information;
specify, using a position specifying section, a present position of the vehicle;
search, by a searching section, for a resting place at which the driver can have a rest based on the present position of the vehicle and information stored in a resting place database when the state determination section determines that the driver is in the inattentive state or in the drowsy state, the information stored in the resting place database being related to places at which the driver can have a rest;
calculate, by an execution unit control section, a necessary travel time required for the vehicle to travel from the present position to the resting place, and
activate, by the execution unit control section, at least one target execution unit to start the operation adapted to eliminate the inattentive state or the drowsy state of the driver when the necessary travel time is equal to or longer than a threshold period that is preliminarily determined, the at least one target execution unit being a part of the at least one execution unit; and
notify the driver, by a notification section, of information of a guidance route to the resting place determined by the searching section by at least outputting an audio guidance to execute a route guidance from the present position to the resting place,
wherein, during a period from a start to an end of the route guidance by the notification section, the execution unit control section activates the at least one target execution unit at a time which does not overlap the audio guidance that is being output in order to start the operation that is adapted to eliminate the inattentive state or the drowsy state of the driver, and
the operation to eliminate the inattentive state or the drowsy state of the driver which is started by the at least one target execution unit is an operation which is pre-defined in a user information database as being correlated to the drive who is a specific driver of a plurality of drivers.

2. The on-board system according to claim 1, wherein the execution unit control section increases the threshold period by an amount based on a necessary guidance period that is necessary for the notification section to notify the guidance route to the driver.

3. The on-board system according to claim 1, wherein the at least one execution unit includes two or more execution units, each of the two or more execution units having an execution duration, and
when the necessary travel time is equal to or longer than the threshold period, the execution unit control section (i) selects the at least one target execution unit so that a total sum of at least one execution duration of the at least one target execution unit is equal to or shorter than the necessary travel time and (ii) activates the at least one target execution unit to start the operation in a predetermined order.

4. The on-board system according to claim 3, further comprising
the user information database, the user information database further storing a plurality of information records related to the plurality of drivers including the driver, wherein
the controller is further configured to
identify, in a driver identification section, the driver; and
each of the information records has information item indicating an effect of each of the two or more execution units to the corresponding driver, and
the execution unit control section selects the at least one target execution unit that is more effective to the driver identified by the driver identification section compared with the execution unit which remains.

5. The on-board system according to claim 2, wherein the state determination section determines a level of the inattentive state of the driver or a level of the drowsy state of the driver based on the driver state information acquired by the information acquiring section, and
the execution unit control section activates the at least one target unit with a higher priority than the notifying of the guidance route by the notification section when the level of the inattentive state or the level of the drowsy state is higher than a predetermined level.

6. The on-board system according to claim 1, wherein the controller is further configured to
when the at least one target execution unit is activated by the execution unit control section,
require, by the at least one target execution unit, the driver to perform a predetermined motion adapted to eliminate the inattentive state or the drowsy state.

7. An information processing apparatus equipped to a vehicle, the vehicle including at least one execution unit executing an operation that eliminates an inattentive state or a drowsy state of a driver who drives the vehicle, the information processing apparatus comprising:
a controller, the controller is configured to
determine, in a state determination section, whether the driver is in the inattentive state or in the drowsy state based on driver state information acquired by an information acquiring section, the driver state information indicating a state of the driver;
search, by a searching section, for a resting place at which the driver can have a rest based on a present position of the vehicle and information stored in a resting place database when the state determination section determines that the driver is in the inattentive state or in the drowsy state, the present position of the vehicle being specified by a position specifying section and the information stored in the resting place database being related to places at which the driver can have a rest;
calculate, by an execution unit control section, a necessary travel time required for the vehicle to travel from the present position to the resting place, the execution unit control section activating at least one target execution unit to start an operation adapted to eliminate the inattentive state or the drowsy state of the driver when the necessary travel time is equal to or longer than a threshold period that is preliminarily determined, the at least one target execution unit being a part of the at least one execution unit; and
notify the driver, by a notification section, of a guidance route to the resting place determined by the searching section by at least outputting an audio guidance to execute a route guidance from the present position to the resting place,
wherein, during a period from a start to an end of the route guidance by the notification section, the execution unit control section activates the at least one target execution unit at a time which does not overlap the audio guidance that is being output in order to start the operation that is adapted to eliminate the inattentive state or the drowsy state of the driver, and
the operation to eliminate the inattentive state or the drowsy state of the driver which is started by the at least one target execution unit is an operation which is pre-defined in a user information database as being correlated to the driver who is specific driver of a plurality of drivers.

8. A program product stored in a non-transitory tangible computer readable storage medium, the program product to be executed by a computer included in an information processing apparatus equipped to a vehicle, the vehicle including controller configured with at least one execution unit that executes an operation adapted to eliminate an inattentive state or a drowsy state of a driver of the vehicle, the program product comprising instructions for implementing:
determining whether the driver is in the inattentive state or in the drowsy state based on driver state information, the driver state information indicating a state of the driver;
searching for a resting place at which the driver can have a rest based on a present position of the vehicle and information stored in a resting place database when determining that the driver is in the inattentive state or in the drowsy state, the present position of the vehicle being specified by a position detecting device and the information stored in the resting place database being related to places at which the driver can have a rest;
calculating a necessary travel time required for the vehicle to travel from the present position to the resting place;
activating at least one target execution unit to start an operation adaption to eliminate the inattentive state or the drowsy state of the driver when the necessary travel time is equal to or longer than a threshold period that is preliminarily determined, the at least one target execution unit being a part of the at least one execution unit configured in the controller; and
notifying the driver of information of a guidance route to the resting place that was determined, by at least outputting an audio guidance to execute a route guidance from the present position to the resting place, wherein
during a period from a start to an end of the route guidance, the at least one target execution unit is activated at a time which does not overlap the audio guidance that is being output in order to start the operation that adapted to eliminate the inattentive state or the drowsy state of the driver, and the operation to eliminate the inattentive or the drowsy state of the driver which is started by the at least one target execution unit is an operation which is pre-defined in a user information database as being correlated to the driver who is a specific driver of a plurality of drivers.

9. The information processing apparatus according to claim 7, wherein
the execution unit control section increases the threshold period by an amount based on a necessary guidance period that is necessary for the notification section to notify the guidance route to the driver.

10. The information processing apparatus according to claim 9, wherein
the state determination section determines a level of the inattentive state of the driver or a level of the drowsy state of the driver based on the driver state information acquired by the information acquiring section, and
the execution unit control section activates the at least one target unit with a higher priority than the notifying of the guidance route by the notification section when the level of the inattentive state or the level of the drowsy state is higher than a predetermined level.

11. The program product according to claim 8, further comprising
increasing the threshold period by an amount based on a necessary guidance period that is necessary for notifying the guidance route to the driver.

12. The program product according to claim 11, further comprising
determining a level of the inattentive state of the driver or a level of the drowsy state of the driver based on the driver state information, and
activating the at least one target unit with a higher priority than the notifying of the guidance route by the notification section when the level of the inattentive state or the level of the drowsy state is higher than a predetermined level.

13. The on-board system according to claim 1, further comprising
an inattentiveness elimination database storing information regarding a plurality of different operations adapted to eliminate the inattentive state or the drowsy state of the driver, including the operation adapted to eliminate the inattentive state or the drowsy state of the driver,
the controller is further configured to
select one of the plurality of different operations in the inattentiveness elimination database which is pre-defined in the user information database as being correlated to the driver among the plurality of drivers, based on an identification of the driver, and
the at least one target execution unit starts the selected one of the plurality of different operations as being specific to the driver.

* * * * *